United States Patent
Dickinson et al.

(10) Patent No.: US 10,138,922 B2
(45) Date of Patent: Nov. 27, 2018

(54) FASTENER CLIP ASSEMBLY WITH PINCH-REMOVABLE CAP

(71) Applicant: Termax Corporation, Lake Zurich, IL (US)

(72) Inventors: Daniel James Dickinson, Lincolnshire, IL (US); Michael Tirrell, Volo, IL (US); John Clasen, Crystal Lake, IL (US)

(73) Assignee: TERMAX LLC, Lake Zurich, IL (US)

( * ) Notice: Subject to any disclaimer, the term of this patent is extended or adjusted under 35 U.S.C. 154(b) by 0 days.

(21) Appl. No.: 15/234,691

(22) Filed: Aug. 11, 2016

(65) Prior Publication Data

US 2017/0051775 A1     Feb. 23, 2017

Related U.S. Application Data

(63) Continuation-in-part of application No. 14/990,792, filed on Jan. 8, 2016, now Pat. No. 9,649,993.

(Continued)

(51) Int. Cl.

| | |
|---|---|
| *B62D 24/02* | (2006.01) |
| *F16B 21/07* | (2006.01) |
| *B60R 13/00* | (2006.01) |
| *B29C 45/00* | (2006.01) |
| *F16B 43/00* | (2006.01) |
| *F16B 5/06* | (2006.01) |
| *B60R 13/02* | (2006.01) |
| *B29L 31/30* | (2006.01) |
| *B29L 31/00* | (2006.01) |
| *F16B 21/16* | (2006.01) |

(52) U.S. Cl.
CPC .......... *F16B 21/076* (2013.01); *B29C 45/006* (2013.01); *B60R 13/00* (2013.01); *B60R 13/0206* (2013.01); *F16B 5/0657* (2013.01); *F16B 43/001* (2013.01); *B29L 2031/30* (2013.01); *B29L 2031/7282* (2013.01); *F16B 21/16* (2013.01)

(58) Field of Classification Search
CPC ......... F16C 2326/24; Y10T 403/32631; Y10T 29/49002; B29C 45/006; B29L 2031/30; B29L 2031/7282; H04B 1/082; H05K 9/0047; H05K 13/00; H05K 9/0007
USPC ....................................................... 296/35.1
See application file for complete search history.

(56) References Cited

U.S. PATENT DOCUMENTS

| | | | | |
|---|---|---|---|---|
| 5,582,074 A | * | 12/1996 | Kelley | .................... F16C 1/103 74/502.4 |
| 6,928,705 B2 | * | 8/2005 | Osterland | ........... B60R 13/0206 24/289 |

(Continued)

*Primary Examiner* — Kiran B Patel

(57) ABSTRACT

A fastener clip assembly including a cap configured to be secured to a chassis through a chassis slot. The cap comprises one or more wings configured to collapse upon inserting the cap into the chassis slot and to expand upon full insertion. The cap is further configured to be secured to the chassis slot at least upon the wings expanding into the chassis slot. The clip further includes a pin configured to be secured to a body panel. The pin is configured to be secured to the cap. The cap comprises one or more releases. The releases are accessible from a side of the cap configured to receive the pin. The releases are configured, upon release, to collapse the one or more wings. The cap is configured to be extracted from the chassis based at least upon releasing the releases.

7 Claims, 9 Drawing Sheets

Related U.S. Application Data

(60) Provisional application No. 62/207,911, filed on Aug. 20, 2015, provisional application No. 62/263,869, filed on Mar. 14, 2016, provisional application No. 62/298,495, filed on Feb. 23, 2016.

(56) References Cited

U.S. PATENT DOCUMENTS

| | | | | |
|---|---|---|---|---|
| 7,165,371 | B2 * | 1/2007 | Yoyasu | B60R 13/04 24/292 |
| 7,287,945 | B2 * | 10/2007 | Lubera | F16B 5/065 24/295 |
| D709,354 | S * | 7/2014 | Komeno | D8/356 |
| 9,533,718 | B2 * | 1/2017 | Smith | F16B 37/043 |
| 2004/0052575 | A1 * | 3/2004 | Draggoo | B60R 13/0206 403/298 |
| 2005/0105987 | A1 * | 5/2005 | Giugliano | F16B 5/065 411/508 |
| 2006/0290155 | A1 * | 12/2006 | Smith | B60R 11/00 296/29 |
| 2007/0046054 | A1 * | 3/2007 | Hinman | B60R 13/0206 296/1.07 |
| 2008/0086850 | A1 * | 4/2008 | Smith | B60R 13/0206 24/289 |
| 2008/0098576 | A1 * | 5/2008 | Smith | B60R 11/00 24/297 |
| 2010/0026028 | A1 * | 2/2010 | Smith | B60R 13/0206 296/29 |
| 2011/0163562 | A1 * | 7/2011 | Smith | B60R 13/0206 296/1.07 |
| 2012/0311829 | A1 * | 12/2012 | Dickinson | F16B 21/075 24/458 |
| 2014/0263895 | A1 * | 9/2014 | Dickenson | B60R 13/0206 248/206.5 |
| 2015/0251624 | A1 * | 9/2015 | Dickinson | B60R 21/216 29/525.08 |
| 2015/0321622 | A1 * | 11/2015 | Dickinson | B60R 13/0206 24/458 |
| 2016/0016522 | A1 * | 1/2016 | Smith | F16B 37/043 296/35.1 |
| 2016/0229368 | A1 * | 8/2016 | Dickinson | B60R 13/0275 |
| 2016/0375840 | A1 * | 12/2016 | Dickinson | F16B 5/065 24/295 |
| 2017/0113632 | A1 * | 4/2017 | Dickinson | B60R 13/02 |
| 2017/0284437 | A1 * | 10/2017 | Landsberg | F16B 5/0642 |

* cited by examiner

FASTENER CLIP ASSEMBLY WITH PINCH-REMOVABLE CAP

A. RELATED APPLICATIONS

| Application Number | Continuity Type/Relation | Priority Application No. | Filing Date | Docket No. | Title |
|---|---|---|---|---|---|
| This preset nonprovisional patent application | Claims benefit of provisional | 62/207,911 | Aug. 20, 2015 | P49 | Adaptive Sealing Fastener |
| This present nonprovisional patent application | Claims benefit of provisional | 62/263,869 | Mar. 14, 2016 | P49-B | Adaptive Sealing Fastener |
| This present nonprovisional patent application | Claims benefit of provisional | 62/298,495 | Feb. 23, 2016 | P49-D | Adaptive Sealing Fastener |
| This present nonprovisional patent application | Continuation in part of | 14/990,792 | Jan. 8, 2016 | P49-C | One Step Assembly Fastener Clip |
| 14/990,792 | Claims benefit of provisional | 62/207,911 | Aug. 20, 2015 | P49 | Adaptive Sealing Fastener |
| 14/990,792 | Claims benefit of provisional | 62/263,869 | Mar. 14, 2016 | P49-B | Adaptive Sealing Fastener |

The above-referenced patents and/or patent applications are hereby incorporated by reference herein in their entirety.

B. CO-PENDING APPLICATIONS

The subject matter of the present application is related to the subject matter of the following commonly assigned, co-pending applications, which are being filed on the same date as the present application: US Nonprovisional Patent Application entitled "Fastener Clip Assembly with Removable Seal" and naming as inventors Daniel James Dickinson, Michael Tirrell, and John Clasen and US Nonprovisional Patent Application entitled "Fastener Clip Assembly with Funnel Guide" and naming as inventors Daniel James Dickinson, Michael Tirrell, and John Clasen.

The above referenced patents and/or patent applications are hereby incorporated by reference herein in their entirety.

BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, door panel, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These conventional fastener devices provide approximately relatively equal levels of insertion and extraction force. These body panels often attach to the chassis of an automobile with a relatively high level of insertion force while providing a relatively low level of extraction force.

Fastener clips, such as two piece fasteners (multi-piece), are known for attaching body panels to an automobile chassis. Two-piece fasteners are used so that if the panels are removed after original installation, such as to service the components in the door, they may be pulled apart so that one portion remains attached to the sheet metal while the other remains attached to the trim panel. The two pieces may also be reattached after separation. However, two piece fasteners require manufacturing of multiple pieces and labor intensive assembly of the two pieces and thus are relatively expensive.

One piece fasteners are typically less expensive than two or multi piece fasteners. One piece fasteners have a base to attach to a body panel and a post attached to the base and wings attached at least to the top of the post at a tip of the fastener for fastening to a frame slot. However, if the frame slot and the fastener are misaligned then the forces on the wings are unequal since the wing closest to the slot edge will experience higher wing compression while the other wing will have insufficient springing force to engage the slot. As the clip is forced into the slot, such high forces on one wing may cause the wing to break off thus rendering the fastener incapable of fastening the body panel to the frame. Worse, the broken, damaged or weakened wing can cause detachment of the body panel or contribute to rattles.

The wings of conventional fasteners have a sharp, unsmooth groove to engage the edge of the frame slot. When the clip is removed however, the sharp edges of the frame slot cut into the softer plastic and cut the groove. During manufacture, the slots are typically formed in the frame of the vehicle, such as in an inner roof or door sheet metal structure, by punching the sheet metal. As the punch enters the sheet metal, the outer part of the sheet metal is pushed toward the inside and a metal puncture or ridge is formed on the inside of the sheet metal. The resulting slot edge on the outer part of the slot is relatively smooth; however the inner part of the slot edge is sharp and rough. Upon removal of the fastener clip, the sharp edges of the frame cut off the groove so that the clip may not be reinserted and reusable.

If the slot is off-center or if the sheet metal varies in thickness or if tolerances in production of the slot in the vehicle chassis or in the trim-piece exist, for example, then engagement of one portion of the hole in the chassis with one of the wings may not provide suitable frictional engagement. Twisting of the body panel will be likely more prevalent because less than all contact points are actually made with the slot of the vehicle chassis. As a result, conventional single piece fasteners do not self-align themselves when the fastener and the body panel are misaligned, and are prone to wing breakage such that the fastener cannot be re-attached.

Conventional fasteners typically do not adequately secure the panel to the vehicle chassis having variations in slot size and location or sheet metal with different curvature or thicknesses throughout. Conventional single piece fasteners do not self-align themselves when the fastener and the body panel are misaligned, and are prone to wing breakage such that the fastener cannot be re-attached. Also, conventional fasteners are not suitable when subjected to a variety of environmental conditions, such as in the presence of vibration at various levels of amplitude and frequency. For example, conventional fasteners of this type typically do not prevent or minimize the amount of buzzing, rattling or any other type of noise that may cause attention to the occupants of the vehicle or otherwise weaken the attachment. Conventional fasteners do not adequately accommodate various levels of production tolerances, such as various dimensions amongst, for example, the body panels as well as the vehicle chassis. Thus, conventional fastener devices typically do not self-align nor adequately fasten to a range of sheet metal thicknesses and do not minimize or eliminate buzzing and rattling and do not sufficiently accommodate variations in production tolerances. As a result, wear, squeaks, rattles, buzzing, corrosion and loss of elasticity and loss of sealing may result, especially after years of vehicle operation and exposure to vibration, heat, humidity, and other environmental conditions.

BRIEF DESCRIPTION OF THE DRAWINGS

Other objects and advantages of the invention may become apparent upon reading the detailed description and upon reference to the accompanying drawings.

Figure 1:
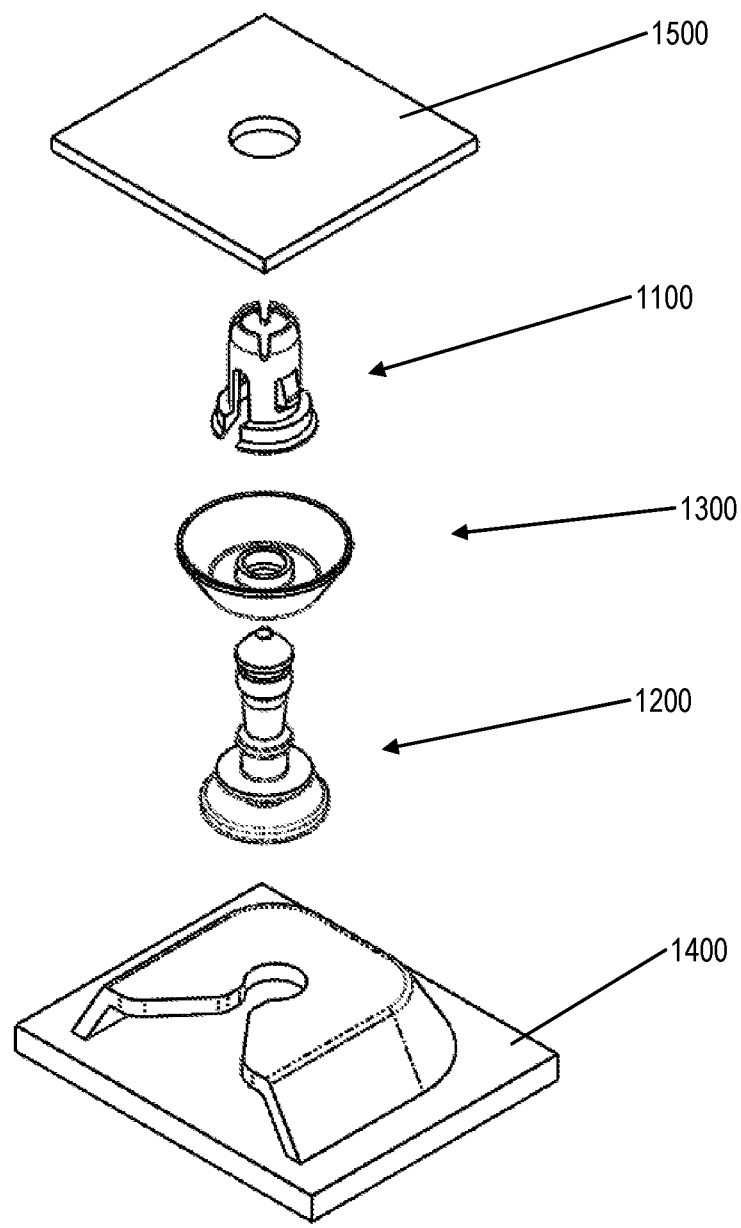
FIG. 1 is an exploded view of a fastener clip assembly, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

DETAILED DESCRIPTION

In some embodiments, a fastener for fastening two automotive parts comprises two main pieces: a cap or grommet and a pin retainer. In some embodiments, the two-piece assembly may be configured to retain various trim panels (such as door pads, side skirts, pillars, etc.) to a car chassis.

The pin may include a head portion and a post extending from the head portion. The cap may include a cap lead-in portion, a funnel, and at least two wings configured to retain the cap into the cap chassis. During service, the cap may remain in the car chassis while the trim panel and pin retainer are removed. In some embodiments, the cap may be configured to be removable. For example, the lead-in portion may be pinchable, such that pinching the lead-in portion can collapse the wings and allow the removal of the cap.

The cap contains a self-centering funnel feature for directing the pin retainer toward the center of grommet in cases where the pin is located off center from the grommet. The funnel may be part of, or formed as a part of, the cap. In alternative embodiments, the funnel may be separate piece configured to attach to the cap. The funnel may have any suitable shape such as a dome, parabola, conical or any other suitable shape to allow the lead-in portion to enter the cap. Among other advantages, the self-centering funnel feature allows any offset pin retainer to easily locate, center, and then engage into the grommet during reassembly of the trim panel, for example.

In some embodiments, the pin comprises a pin head at one end of the pin and a head portion on the end opposite the pin head, where the head portion is configured to removably couple to a body panel, for example. The pin may also comprise a seal, which includes a central hub for insertion over the pin head, a sealing flange coupled to the central hub, with the sealing flange being adjacent to the head portion. The seal may be configured to couple to the pin or the seal may be formed as part of the pin. The seal also comprises an umbrella that is connected to and supported by the sealing flange. The umbrella may be configured to substantially seal against the chassis slot, to which the cap is attached, when the pin is attached to the cap.

In embodiments where the seal is manufactured separately from the pin, the seal may not require the more complicated and process-intensive formation of the seal on the pin or cap. The seal may be separately made by, for example, by injection molding and then inserted and coupled to the pin. Such a process may avoid forming the cap and then forming the seal on the cap, which may require special jigs and molds. Instead, the seal may be made independent of the manufacturing of the cap or pin. Further, the umbrella seal may have a radius flaring outwardly from a perimeter of the sealing flange such that the umbrella seal compensates for any non-uniformities in a chassis slot. Since the umbrella seal has a much greater area and is more flexible than prior seals, the body panel, such as the door panel is better sealed (compared to the sealing cap) from any water or dirt that may enter from the chassis or sheet metal side. As such, a substantial portion of the surface of the umbrella seals the chassis or door frame metal.

In some embodiments, the cap comprises a head portion, a post extending from the head portion, and a lead-in section extending from the post at an end opposite from the head portion. At least two wings extend between the head portion and the lead-in section. The at least two wings comprise an engagement region having a smooth depressed portion. For example, the engagement region is configured to facilitate detaching and re-attaching the fastener clip to a slot in a frame. The engagement regions include a depressed portion configured to adapt to variations or movement of a slot.

FIG. 1 is an exploded view of a fastener clip assembly, in accordance with some embodiments.

In some embodiments, the fastener clip assembly comprises cap/grommet 1100 and pin/pin retainer 1200. Pin 1200 is configured to engage and secure itself into an opening at the bottom of cap 1100.

In some embodiments, the two-piece assembly may be configured to retain various trim panels (such as panel 1400) to a car chassis (such as chassis 1500). Cap 1100 may be configured to attach to a slot in chassis 1500, and pin 1200 is configured to attach to panel 1400. In some embodiments, chassis 1500 may be attached to panel 1400 based at least upon pin 1200 being configured to attach to cap 1100.

In some embodiments, seal component 1300 is configured to attach over pin 1200 and to form a seal against chassis surface 1500 when the pin is attached to the cap. In some embodiments, forming a seal against chassis surface 1500 prevents water, dirt, and other debris from entering through the chassis slot.

In some embodiments, cap 1100 may also include a funnel facing toward pin 1200 configured to guide the pin into the cap. For example, in situations where the pin may approach the cap off center (off the center axis going through the center of the cap), the funnel is configured to align the pin with the center of the cap so that the pin may properly engage the cap.

In some embodiments, the cap may also include a service slot configured to facilitate pinching the cap. Accordingly, the cap may be pinched while installed in the chassis slot, thereby collapsing wings that may be securing the cap to the chassis and allowing removal of the cap from the chassis.

Figure 2:
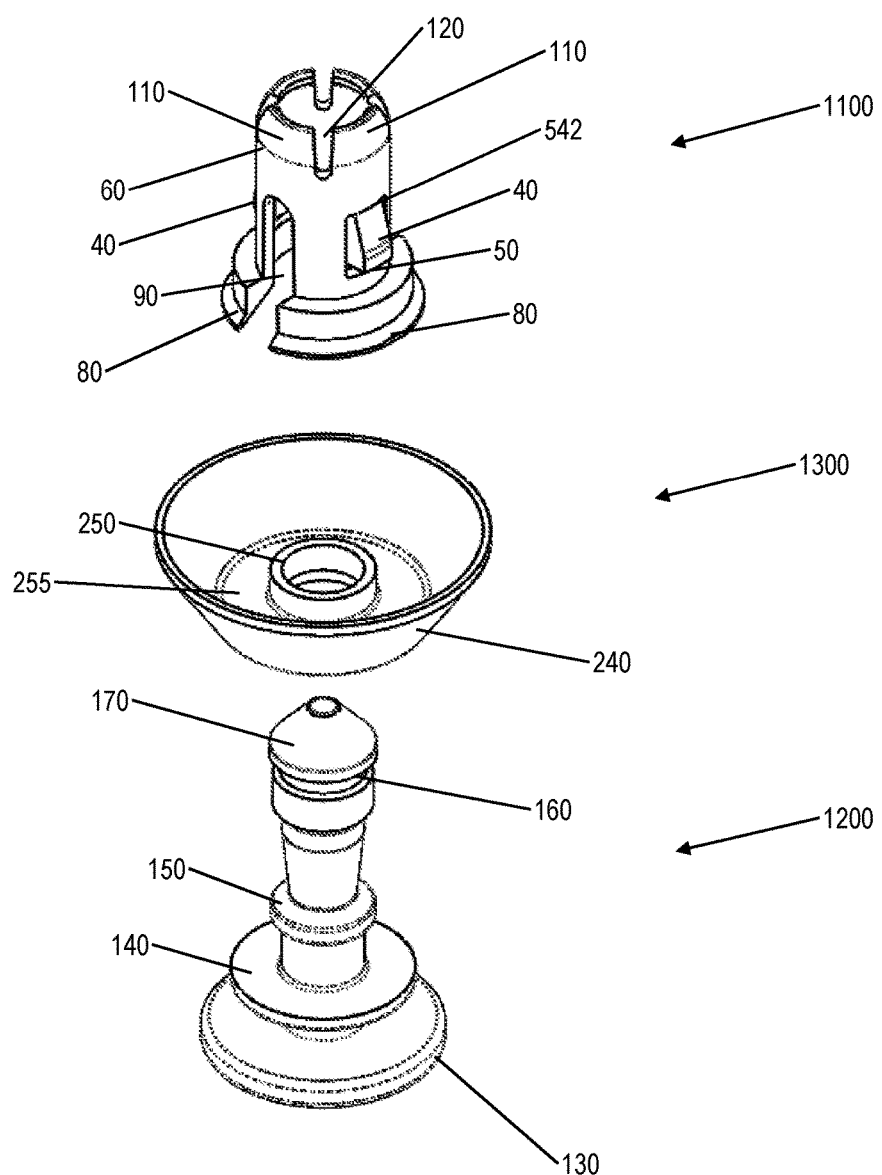
FIG. 2 is an alternative exploded view of a fastener clip, in accordance with some embodiments.

FIG. 2 is an alternative exploded view of a fastener clip, in accordance with some embodiments.

Figure 3:
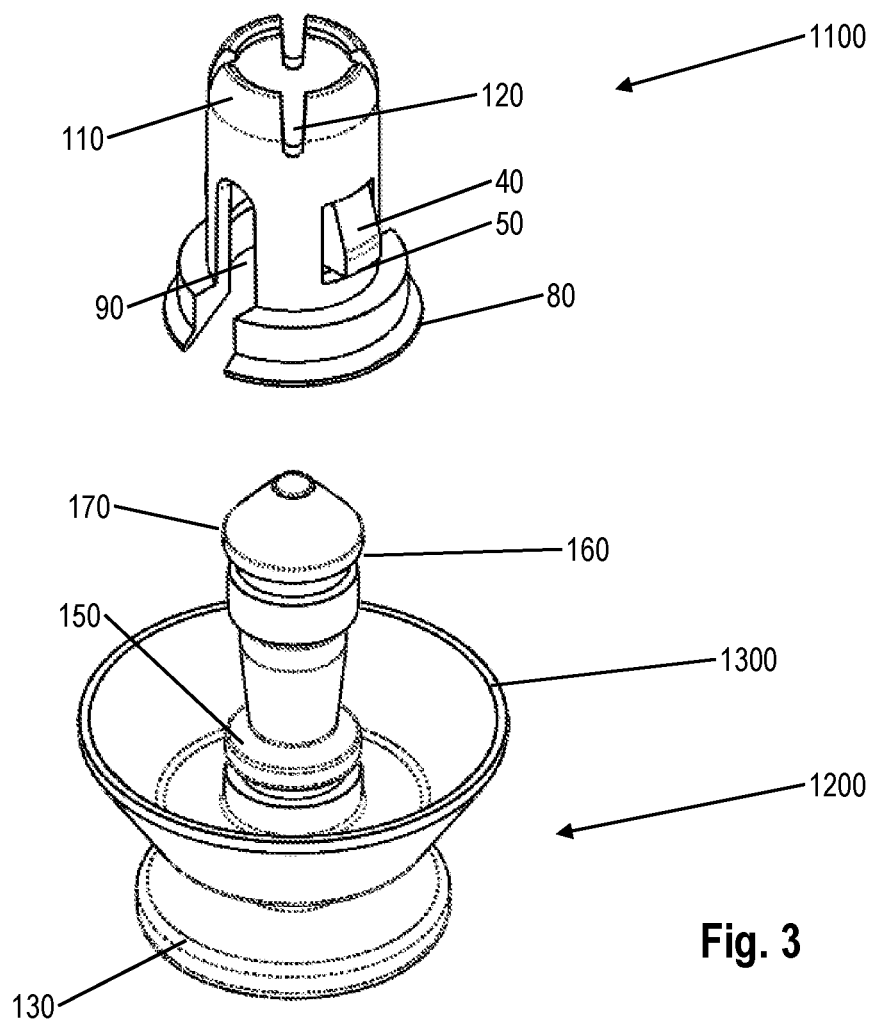
FIG. 3 is another alternative exploded view of a fastener clip, in accordance with some embodiments.

FIG. 3 is another alternative exploded view of a fastener clip, in accordance with some embodiments.

Figure 4:
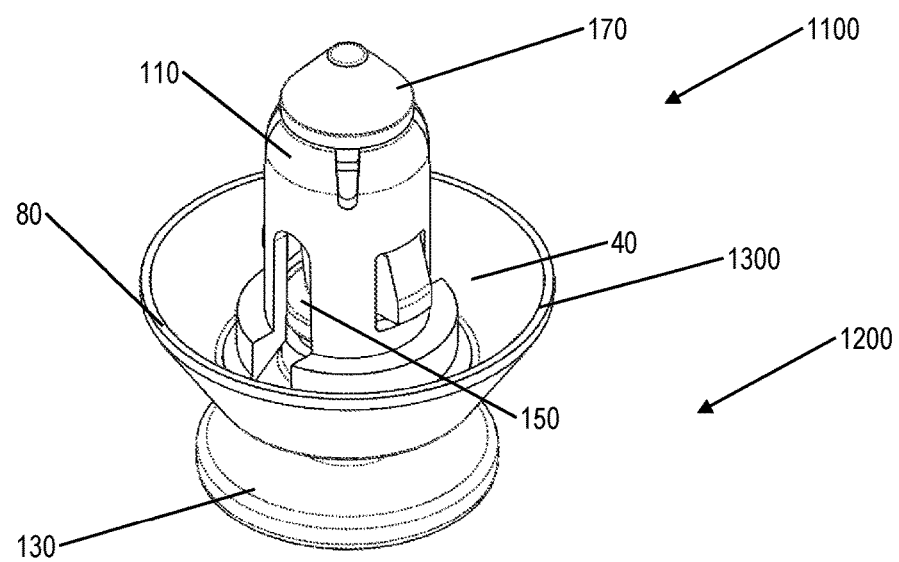
FIG. 4 is an assembled view of a fastener clip, in accordance with some embodiments.

FIG. 4 is an assembled view of a fastener clip, in accordance with some embodiments.

The fastener clip is shown with cap 1100, seal 1300, and pin 1200.

Cap 1100 comprises two wings 40, which are configured to secure the fastener clip to a slot in a car chassis, for example. Any suitable number of wings 40 may be used. For example, one, two, three, four, etc. wings 40 may be used. According to one embodiment, the wings 40 may have any suitable shape, such as, for example, at least one of: tapered, straight, curved, or any suitable shape.

The wings 40 have a size, such as a width, length, thickness and a pivot point 542 to provide high extraction force levels while the insertion force level remains relatively very low. According to some embodiments, the wings 40 may be fins of varying widths. In some embodiments, the lead-in 60 may be inserted first into a slot in a chassis to ensure that the fastener clip self-aligns and the wings 40 evenly spring inward as the insertion force is low relative to the extraction force. During extraction, the wings 40 are also in compression; such that the engagement region 50 provides a higher extraction force relative to the insertion force. Additionally, the width of the wing 40 may be increased, increasing the size of the engagement region and the strength of the wing.

According to some embodiments, the engagement region 50 includes a depressed portion formed on each wing 40, such that each depressed portion is configured to engage at least a portion of the chassis slot 640 and is configured to adapt to variations or movement of the chassis slot.

In some embodiments, cap 1100 may also comprise funnel portions 80. Funnel portions 80 are configured to guide the head of pin 1200 toward the center of cap 1100 as pin 1200 is pushed into cap 1100 for engagement. As such, less accuracy is needed in the alignment of cap 1100 and pin 1200 when the two approach each other for engagement.

In some embodiments, cap 1100 comprises two (more or less in alternative embodiments) service slots 90 placed between funnel portions 80. The service slots 80 are configured to allow inward bending of funnel portions 80 upon pinching of the funnel portions. As such, funnel portions 80 act as releases for the wings 40. As the funnel portions 80 collapse inward, so do wings 80. As such, releasing/pinching the releases/funnel portions 80 disengages the wings from the chassis slot surface and allows for a relatively easy removal of cap 1100 from the chassis slot.

In some embodiments, two service slots 90 may be evenly placed between the two funnel portions 80 to facilitate the inward bending of funnel portions 80 (and wings 40).

In some embodiments, cap 1100 may also include crown portions 110. Crown portions 110 are configured to bend and then snap back into position as the head of pin 1200 is inserted into cap 1100. Crown portions 110 are configured to engage a bottom surface of the head of the pin to lock the pin to the cap once the pin is inserted into the cap.

In some embodiments, small slots 120 are placed between crown portions 110. The small slots may be configured to facilitate the bending of crown portions 110, such that the crown portions 110 can bend enough to allow enough bending for engaging the head of pin 1200. In some embodiments, the small slots 120 may be placed between the wings 40 and service slots 90 for higher rigidity of cap 1100.

Pin 1200 is configured to engage and lock itself into cap 1100. Pin 1200, in some embodiments, comprises pin head 170, which is tapered and is configured to guide the pin into the cap. A bottom surface 160 of the pin head 170 is configured to engage the top of crown portions 110 and to lock against them in order to prevent easy removal of the pin from the cap. Base disk 130 of the pin is configured to engage and lock into a housing in a trim panel, for example.

Removable seal 1300 is configured to slide over pin 1200 through rim 250 and to form a seal against the chassis surface upon the pin engaging and locking into cap 1100. Umbrella 240, which is the portion of the seal configured to seal against the surface of the chassis, is attached to the pin 1200 through central hub 250. In some embodiments, removable seal 240 may rest between base disk 140 and seal retainer 150, which are configured to keep the seal in place.

In some embodiments, seal retainer 150 may also be configured to push against funnel portions 80. In such embodiments, when the pin and the cap are engaged and locked to each other, seal retainer 150 is configured to prevent funnel portions from collapsing and releasing the cap from the chassis slot.

It should be noted that having a removable provides several advantages. For example, the parts may be manufactured more easily and may be made from different materials—such as a harder and more rigid material for the pin and a softer and more sealing material for the seal.

In some embodiments, the fastener clip may be manufactured with injection molding using materials such as plastic nylon, polyoxymethylene (POM, also known as acetal), ABS, Polypropylene, rubber materials of various hardness, etc. It should be noted again that different materials may be used for the different parts of the fastener clip.

Figure 5:
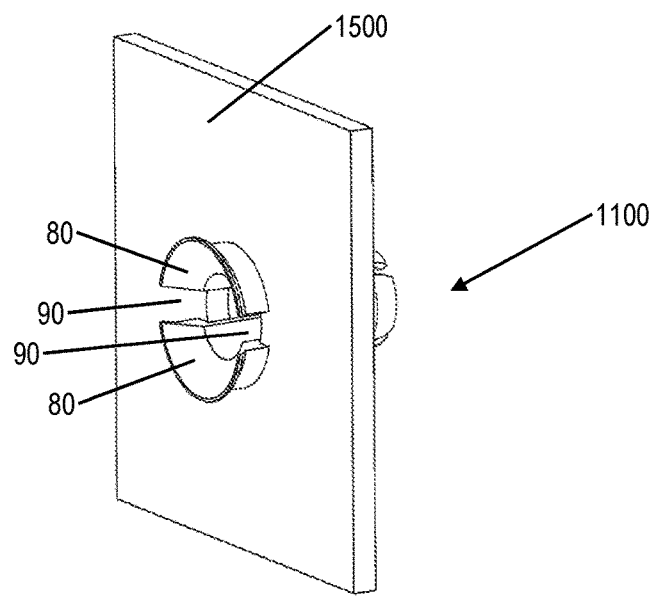
FIG. 5 is a perspective view of a fastener clip, in accordance with some embodiments.

FIG. 5 is a perspective view of a fastener clip, in accordance with some embodiments.

Figure 6:
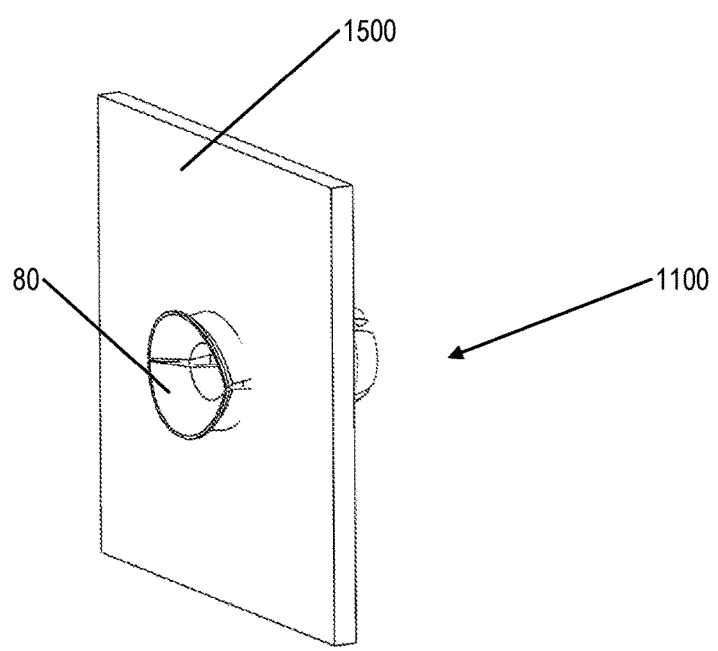
FIG. 6 is another perspective view of a fastener clip, in accordance with some embodiments.

FIG. 6 is another perspective view of a fastener clip, in accordance with some embodiments.

Figure 7:
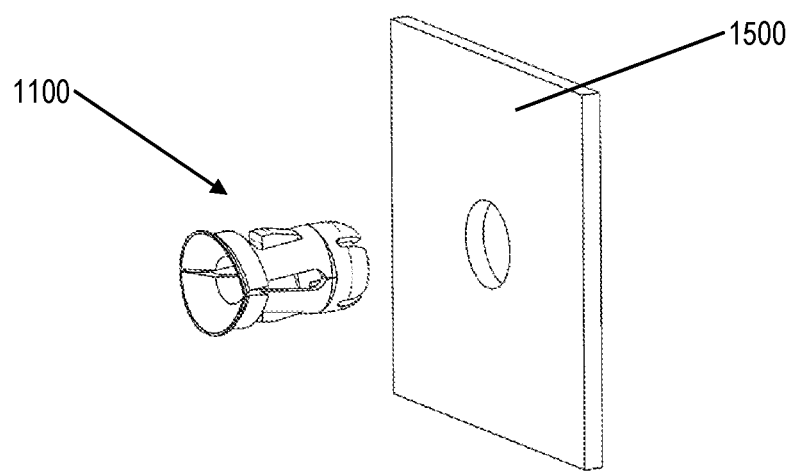
FIG. 7 is yet another perspective view of a fastener clip, in accordance with some embodiments.

FIG. 7 is yet another perspective view of a fastener clip, in accordance with some embodiments.

FIG. 5 shows a bottom view of cap 1100 as the cap may be installed through a slot 1500. Funnel portions 80 comprise funnel-tapered that can be used to guide the head of a pin into the cap in cases where the pin may not be perfectly aligned with the cap. Service slots 90 provide enough space to allow funnel portions 80 to collapse enough when pinched (from the bottom side) in order for the wings of the cap (not shown here) to collapse to permit removal of the cap from the chassis 1500.

FIG. 6 better shows funnel portions 80 in the collapsed position, just prior to removal of the cap.

FIG. 7 shows cap 1100 after the cap has been removed from the slot in chassis 1500 using the pinching method described above.

Figure 8:
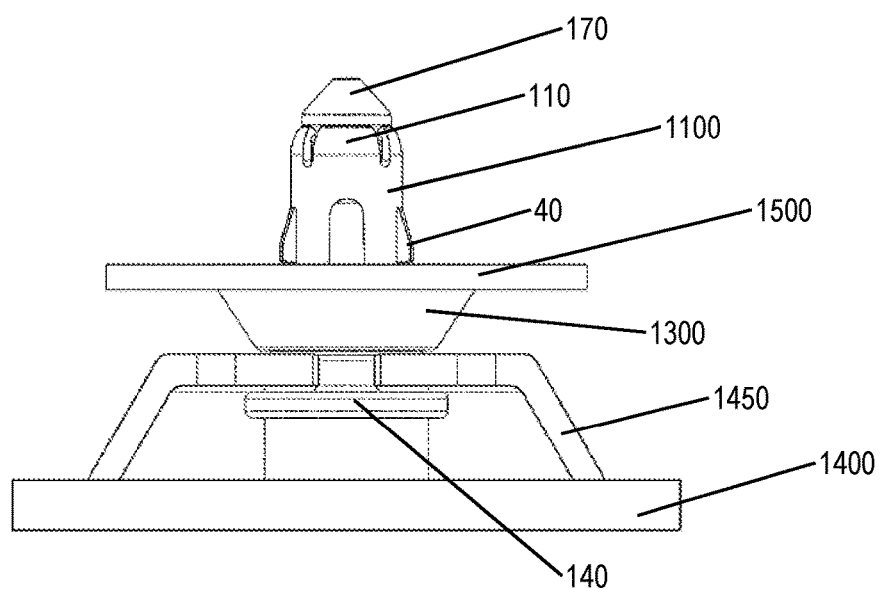
FIG. 8 is a side view of an assembled fastener clip, in accordance with some embodiments.

FIG. 8 is a side view of an assembled fastener clip, in accordance with some embodiments.

Figure 9:
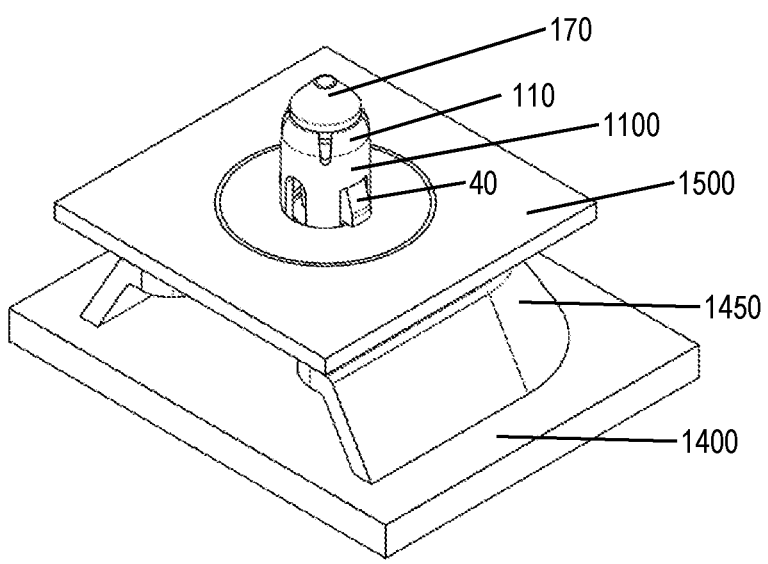
FIG. 9 is a perspective view of an assembled fastener clip, in accordance with some embodiments.

FIG. 9 is a perspective view of an assembled fastener clip, in accordance with some embodiments.

Cap 1100 is installed in a slot in chassis 1500, with the wings 40 in the extended position over the surface of chassis 1500, thereby supporting cap 1100 against the chassis. Base disk 140 of the pin attaches the pin to housing 1450 of the trim panel 1400. The pin has been pushed through the cap 1100 and pin head 170 is secured to the cap by crown portions 110, thereby securing trim panel 1400 to chassis 1500.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip assembly comprising:
a cap configured to be secured to a chassis through a chassis slot, wherein the cap comprises one or more wings configured to collapse upon inserting the cap into the chassis slot and to expand upon full insertion, wherein the cap is configured to be secured to the chassis slot at least upon the wings expanding into the chassis slot;
a pin configured to be secured to a body panel, wherein the pin is configured to be secured to the cap;
wherein the cap comprises one or more releases, wherein the releases are accessible from a side of the cap configured to receive the pin, wherein the releases are configured, upon release, to collapse the one or more wings, wherein the cap is configured to be extracted from the chassis based at least upon releasing the releases.

2. The fastener clip assembly of claim 1, wherein the one or more releases form one or more funnel portions, wherein the funnel portions are configured to guide the pin into the cap by centering the pin over the cap.

3. The fastener clip assembly of claim 1, wherein the pin is configured to, upon being inserted into the cap, prevent the releases from releasing, based at least upon at portions of the pin resting against the releases.

4. The fastener clip assembly of claim 1, wherein the cap further comprises one or more service slots spaced between the one or more releases.

5. The fastener clip assembly of claim 1, wherein the funnel has a radius flaring outwardly from the center of the cap and configured to guide the pin toward a center axis of the cap.

6. The fastener clip assembly of claim 1, wherein the pin further comprises: a base disc configured to releasably detach from a corresponding housing on a body panel.

7. The fastener clip assembly of claim 1, wherein the pin and the cap are injection molded.

* * * * *